No. 655,787. Patented Aug. 14, 1900.
G. D. LEADBETTER.
PERAMBULATOR.
(Application filed Dec. 23, 1899.)
(No Model.)
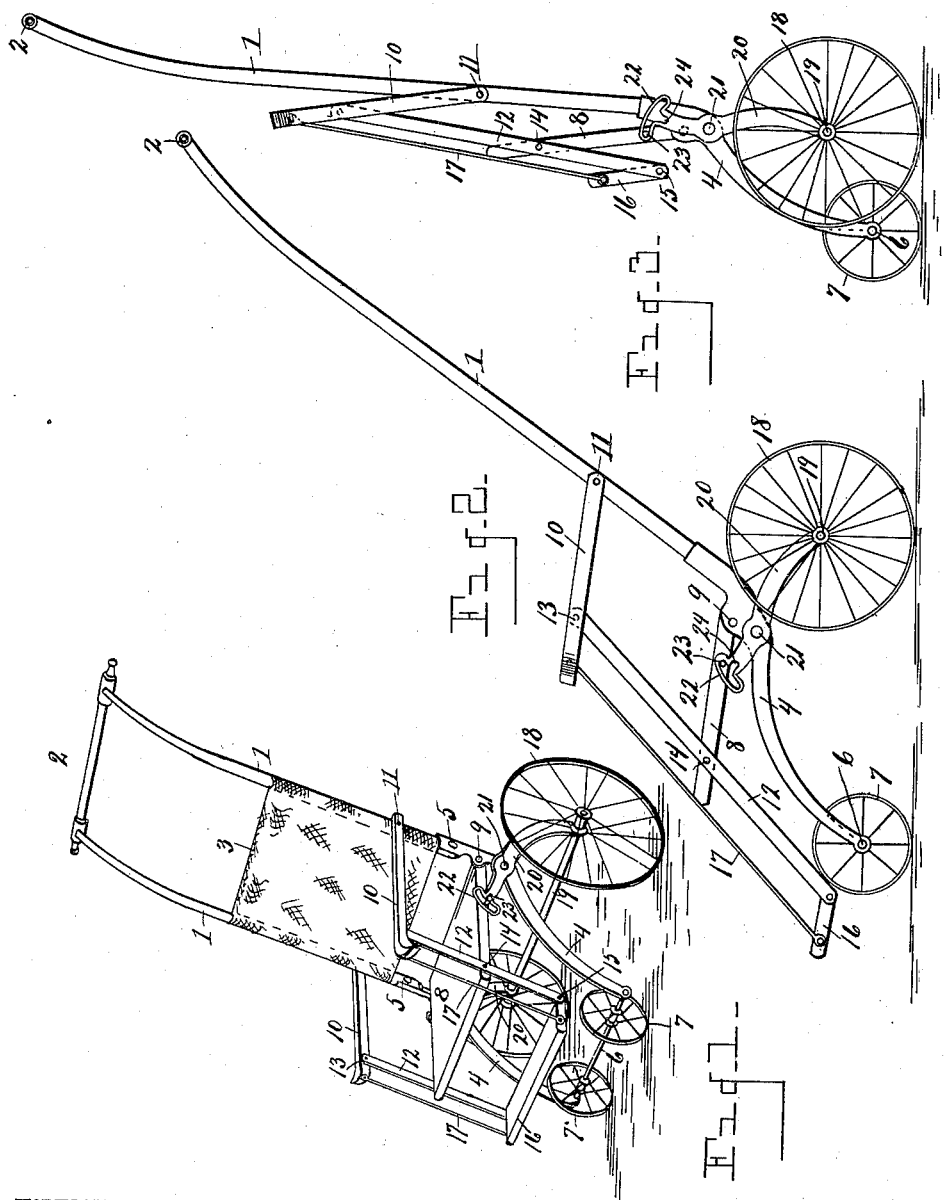
WITNESSES.
INVENTOR.
George D. Leadbetter
Attorneys.

United States Patent Office.

GEORGE D. LEADBETTER, OF DETROIT, MICHIGAN.

PERAMBULATOR.

SPECIFICATION forming part of Letters Patent No. 655,787, dated August 14, 1900.

Application filed December 23, 1899. Serial No. 741,369. (No model.)

*To all whom it may concern:*

Be it known that I, GEORGE D. LEADBETTER, a citizen of the United States, residing at Detroit, in the county of Wayne, State of Michigan, have invented certain new and useful Improvements in Perambulators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to folding perambulators; and it consists in the construction and arrangement of the parts hereinafter fully set forth, and pointed out particularly in the claims.

The object of the invention is to produce a cart or perambulator of the class described, of comparatively simple and inexpensive construction, in which the arrangement is such as to enable the seat and foot-rest of the cart to be lowered from their normal position and the back inclined rearwardly, so as to place the occupant in a partially-recumbent position, and by a further arrangement enable the seat, arms, and foot-rest of the cart to be folded against the uprights of the back and the four transporting-wheels to be brought together, so that the parts of the cart will occupy a compact folded position.

The above object is obtained by the construction and association of the parts illustrated in the accompanying drawings, in which—

Figure 1 is a perspective view of a cart embodying my invention and showing said cart in its normal position. Fig. 2 is a side elevation showing the cart in position to enable the occupant to partially recline therein. Fig. 3 is a side elevation showing the cart folded.

Referring to the characters of reference, 1 designates the main uprights, comprising the frame of the back and united at their upper ends by a cross-bar 2, which latter serves as a handle to propel the cart. Crossing between the uprights 1, near their lower ends, is a fabric 3, of any suitable material, which serves as a back to the cart.

4 designates two curved arms having sockets 5 on their upper ends, which receive the lower ends of the uprights 1. Said arms curve downwardly and forwardly and carry at their lower ends a shaft 6, upon which the small forward wheels 7 are journaled.

The seat 8 is pivoted at its rear edge to the arms 4, as shown at 9, while the arms 10 are pivoted to the uprights, as shown at 11. The bars 12, extending on opposite sides of the seat, connect said seat with the arms 10, being pivoted at 13 to said arms and at 14 to said seat. The lower ends of said bars extend some distance below the seat and are pivoted at 15 to the foot-rest 16. Extending between the outer ends of the arms 10 and the outer edge of the foot-rest 16 are the rods 17, which are pivoted at their opposite ends to said part and serve to maintain the foot-rest on a plane with the seat whether the cart is folded, is in its normal position, or extended.

The larger transporting-wheels 18 are journaled upon a transverse shaft 19, which is supported in the lower ends of the braces 20. These braces are pivoted at 21 to the arms 4 and carry at their upper ends a slotted head 22, which receives the pin 23, projecting from the side of the seat. The slot in the head 22 of the said brace is oblong and stands nearly transverse to the point of pivot 21 of said brace. Formed in the upper end of said brace and communicating with said slot is a notch 24, in which the pin 23 is adapted to lie when the cart is in the position shown in Fig. 1.

It will be seen that the braces 20 serve as a support for the seat 8 as well as to carry the transporting-wheels 18. When the pins 23 are resting in the notches 24, the seat of the cart will be supported in an extended position, as shown in Fig. 1, which is the normal position when the cart is in ordinary use. Should it be desired to place the cart in a position so that a child might partially recline therein, the pins 23 are disengaged from the notches 24, permitting the braces 20 to swing upon their pivots and the parts to assume a position shown in Fig. 2, wherein the back inclines rearwardly and the foot-rest is extended, so that a child may be placed in a more comfortable position to sleep, if desired, and still enable the cart to be propelled without any inconvenience, as the handle, even when the cart is extended, is within easy reach of the operator. When it is desired to fold the cart to place it out of the way or when carrying it into a public vehicle, by placing the foot upon the axle 19 and pulling upward upon the upright 1 the parts will fold into the position shown in Fig. 3, the pins 23 traveling to the opposite extremity in the slotted heads 22 and the smaller wheels 7 drawing between the larger wheels 18, thereby greatly reducing the length of the wheel-base of the cart and contracting its parts to a comparatively-small compass. The cart may be readily changed from its folded position, when desired for use, by pressing downward upon the outer end of the seat, causing the parts to assume the position shown in Fig. 1.

Having thus fully set forth this invention, what is claimed is—

1. In a folding cart, the combination of the uprights carrying the forward wheels at their lower ends, the seat pivoted to said uprights, the braces also pivoted to said uprights and carrying at their lower ends the rear set of wheels, the upper ends of said braces having slots therein, and the pins projecting from the sides of said seat and engaging in said slots.

2. In a cart, the combination of the main uprights carrying at their lower ends the forward set of wheels, the seat pivoted to said uprights, the braces also pivoted to said uprights and carrying at their lower ends the rear set of wheels, the upper ends of said braces having each a slotted head and a notch communicating with said slot, pins projecting from the sides of the seat lying in the slots in said heads and adapted to engage in said notches, whereby the seat may be supported at two different elevations and permitted to fold upward adjacent to said uprights.

3. In a cart, the combination of the uprights carrying at their lower ends the forward set of wheels, the seat and the arms pivoted to said uprights, the bars pivoted to said arms and seat and supporting the foot-rest, the braces pivoted to said uprights and having a movable connection with said seat.

In testimony whereof I sign this specification in the presence of two witnesses.

GEORGE D. LEADBETTER.

Witnesses:
E. S. WHEELER,
C. EDNA JOSLIN.